Dec. 22, 1925.

1,567,018

S. H. AMSDEN

GRINDING MACHINE SPINDLE BEARING

Filed August 11, 1920

Witnesses.

John H. McKenna

J. Calvin Bright

Inventor
S. Harold Amsden,

By Clayton L. Jenks

Attorney.

Patented Dec. 22, 1925.

1,567,018

UNITED STATES PATENT OFFICE.

SIDNEY HAROLD AMSDEN, OF WORCESTER, MASSACHUSETTS, ASSIGNOR TO NORTON COMPANY, OF WORCESTER, MASSACHUSETTS, A CORPORATION OF MASSACHUSETTS.

GRINDING-MACHINE-SPINDLE BEARING.

Application filed August 11, 1920. Serial No. 402,891.

*To all whom it may concern:*

Be it known that I, SIDNEY HAROLD AMSDEN, a citizen of the United States of America, residing at Worcester, in the county of Worcester and State of Massachusetts, have invented certain new and useful Improvements in Grinding-Machine-Spindle Bearings, of which the following is a full, clear, and exact specification.

My invention relates to bearings for high speed spindles, such as the wheel spindles of grinding machines, and, more particularly, to a bearing construction adapted for use in internal grinding operations.

The wheel spindles used in internal grinding are driven at a high speed and must run true to avoid "chatter marks" on the work. In some cases they are provided with oppositely tapered bearing portions, which are supported in correspondingly tapered bearing bushings, the latter being made adjustable to take up the wear. Some difficulty has been experienced in adjusting these bushings at all times, e. g., while the spindle is running and the wheel is in engagement with the work, and especially has this been the case with the adjustment of the bearing adjacent the grinding wheel. It is frequently necessary, however, to make an adjustment of the bearings in spindles of this type after the machine has been running for some time and the bearings become too warm, because of the expansion of the spindle or from other causes, and also to adjust the bearings for wear. Because of the difficulty of adjusting the bearings while the machine is grinding in the constructions heretofore known, it becomes necessary to stop the machine, or at least to remove the wheel and spindle from the work, in order to allow the proper adjustment to be made, thereby consuming much time and cutting down production.

It is an object of my invention to overcome these objections by providing an internal grinding spindle having a tapering bearing adjacent the wheel with means adjacent the opposite end of the spindle for quickly and accurately adjusting the said bearing at all times, without the necessity of stopping the grinding operation.

It is a further object of my invention to provide a spindle having bearings, one of which is tapered and the other of which is connected to move longitudinally with the spindle, whereby movement of the spindle and its connected bearing adjusts the tapered bearing.

With these and other objects in view, as will appear from the disclosure hereinafter made, the invention resides in the combinations of parts illustrated in the drawings, and described in the specification and covered by the claims annexed hereto.

In the drawings, in which I have shown one specific embodiment of my invention:

Figure 1:
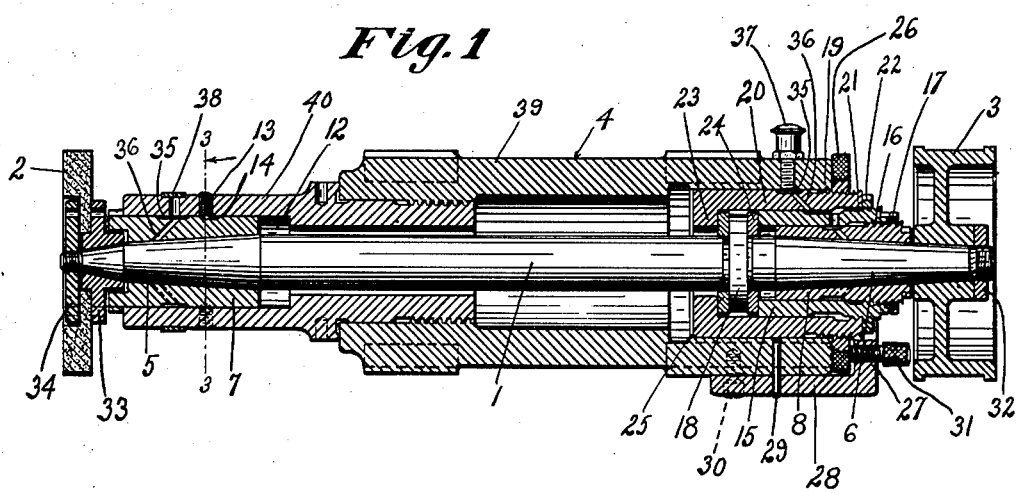
Figure 1 shows my improved internal grinding spindle fixture, the section being taken approximately along the line 1—1 of Fig. 2.
Figure 2:
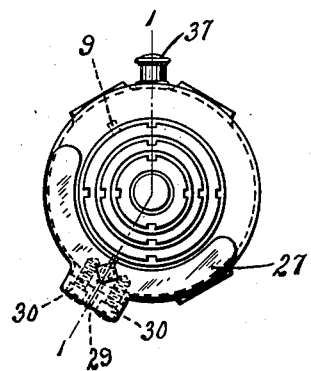
Fig. 2 shows a rear end view of the fixture with the pulley removed.
Figure 3:
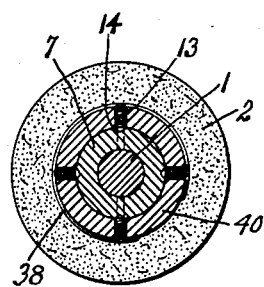
Fig. 3 shows a cross section on the line 3—3 of Fig. 1 looking in the direction of the arrow.

In the practice of my invention, I have provided a spindle fixture adapted for internal grinding operations, comprising a spindle 1, herein shown as carrying a grinding wheel 2 at one end and a pulley 3 at the opposite end. The spindle is mounted to rotate in a housing 4, adapted to be fitted to the particular part of the grinding machine with which it is designed to be utilized. I have shown the spindle mounted in a housing especially adapted to be mounted on the swivel head of a universal grinding machine. The spindle is preferably tapered oppositely adjacent its ends, as at 5 and 6, and these tapered portions run in correspondingly tapered bearings 7 and 8 suitably carried in the housing 4. Bearing 7 may be relatively fixed with reference to the housing, while bearing 8 is connected to the spindle, and means is provided for moving the bearing 8 and the spindle to adjust the spindle to the bearing 7.

It is apparent that when the grinding wheel is fed into the work, lateral pressure, dependent on the depth of cut, produces corresponding side thrust on the spindle, with a consequent rapid wearing away of the tapered bearing adjacent the wheel. It is, therefore, important that provision be made for quickly and easily adjusting the bearing to take up for wear. This ease of adjustment is further made necessary to avoid sticking of the spindle due to its expansion after becoming warm if the bearings should happen to be too tightly adjusted at the start.

In the specific embodiment of my invention selected for illustration, I have shown the front tapered bearing 7 in the form of a sleeve snugly fitting a counterbore 12 at the front end of the housing 4 and held in place by pointed set screws 13 engaging corresponding recesses 14 in the sleeve. Since this bearing sleeve, as shown, is fixed relative to the housing, it becomes necessary to move the spindle longitudinally to adjust the fit of the bearing. This longitudinal movement is not large enough to affect the work being operated on.

As previously stated, the rear radial bearing 8 is connected to move longitudinally with the spindle 1 and this connection is effected conveniently by forming this bearing 8 as a tapered sleeve engaging the similarly tapered portion 6 on the spindle, the sleeve being telescoped into an intermediate sleeve 15 and connected thereto adjustably by means, such as a screw threaded connection 16, provided with a lock nut 17. This intermediate sleeve cooperates with a flange 18 on the spindle to take the thrust of the spindle in one direction and is telescoped into an outer sleeve 20 and connected thereto by a connection similar to the connection between inner sleeve 8 and sleeve 15, such as the screw threaded connection 21 and lock nut 22. The outer sleeve carries at its forward end an inwardly extending flange 23 adapted to receive the thrust of the spindle 1 in the other direction. Thrust washers 24 and 25 are provided on opposite sides of the flange 18, between it and the sleeve 15 and flange 23 on sleeve 20 respectively. The outer sleeve 20 fits slidably into the bore at the rear end of the housing 4 and is held from rotating relatively thereto by a keyed connection 9. The rear end of the sleeve 20 is screw threaded as at 19 and normally projects beyond the housing. The screw threaded part forms part of the means for moving the sleeve 20 and hence the rear bearings and spindle 1 relative to the housing 4 to adjust the front bearing, and to this end it is engaged by a knurled nut 26 preferably of slightly larger diameter than the housing so as to be readily grasped by the hand of the operator. This nut bears against the rear end of the housing and is held thereagainst by a web 27 fitting against the rear of the nut and having an extension 28 at right angles thereto which is suitably fastened to the housing as by means of a dowel pin 29 and screws 30. To lock the nut in any adjusted position, I may use a set screw 31 and to permit ready manual operation thereof I may construct it with a knurled head, as shown.

The rear tapered portion of the spindle is preferably extended to receive the driving pulley 3 suitably connected thereto and held in place by the nut 32 engaging the screw threaded end of the spindle. To the forward end of the spindle is secured the grinding wheel 2, held in place by the flanges 33 and 34, the latter engaging a screw thread on the end of the spindle.

I have shown a suitable means for oiling the spindle bearings consisting of a series of circumferential grooves 35 on the outside of the bearing sleeves and conduits 36 extending therefrom through the sleeves and from the outside of the housing 4 to the groove on the sleeve next thereto, these grooves and conduits forming continuous passages leading from the outside of the housing to the spindle. I have shown the rear oil passage as supplied from an oil cup 37 and at the forward bearing I have shown the oil passage normally covered by a flat spring ring 38 fitting within a groove on the outside of the housing.

In the operation of my invention, the thrust bearing sleeve 15 and the rear conical bearing sleeve 8 are first adjusted to give the proper pressure in these bearings and thereafter these will require little attention because not subject to the strains and wear of the forward bearing sleeve 7 and because the distance between the thrust and rear radial bearings is relatively small, so no adjustment need be made for the expansion of the spindle when it becomes warm. If the front bearing 7 be tight at the start when the spindle is cold, as the spindle warms up and in doing so expands, this bearing might become so hot as to seize the spindle. However, an experienced operator can readily tell whether the bearing heats up too rapidly and if so, by my construction he merely rotates the nut 26 which moves the spindle endwise until the proper fit is obtained between the tapered portion 5 and the bearing sleeve 7, all of which can be done while the spindle is running, thus saving considerable time. When the bearings have been properly adjusted, he locks the nut 26 by rotating the set screw 31 into engagement therewith. As the bearing sleeve 7 becomes worn, he makes the necessary adjustment from time to time to take up the wear.

My device is readily assembled and disassembled, for, starting with the spindle 1, the thrust bearing and the rear tapered bearing are assembled thereon and the adjusting nut 26 screwed onto the outer sleeve 20, after which the pulley 3 may be fastened in place. The whole is then placed into the rear end of the spindle housing, after which the web 27 is fastened in place to hold the parts in the housing 4. The wheel 2 may now be placed in position on the front end of the spindle, the front bearing sleeve 7 having been first fastened in the counterbore 12 of the housing. The housing is preferably made in two parts for convenience of manufacture, said parts consisting of a body portion 39 and a nose portion 40. By having on hand spindles of different lengths having the rear end thrust bearing assembled thereon and also nose portions 40 corresponding to the spindle length, the operator can quickly change one for the other by the removal of the wheel-holding flange 34 and the screws 30 holding the web 27 in place, thus changing the fixture to suit the grinding operation in a minimum of time and utilizing the same body portion 39 all the while.

From the foregoing description it will be seen that by my construction I am enabled to rapidly assemble and disassemble my spindle bearing and adapt it readily for different work, and that I provide a readily operable means for adjusting the bearings and particularly the front bearing, which is subject to the greatest wear and any side play which at once affects the work.

While I have shown and described one specific embodiment of my invention, it will be evident that changes can be made by those skilled in the art without departing from its spirit and scope as expressed in the claims, and I do not wish to be otherwise limited to the details herein disclosed.

What I claim as new, and desire to secure by Letters Patent, is:

1. A grinding machine spindle fixture comprising a housing, a spindle having oppositely tapered bearing portions within said housing, a bearing for one of said tapered portions adapted to be held immovable relative to the housing, a movable bearing connected with the spindle to move longitudinally therewith for the other of said tapered portions, means for moving said movable bearing with the spindle to adjust the fit between the immovable bearing and the spindle and means to adjust the movable bearing relative to the spindle for both radial and longitudinal wear.

2. A grinding machine spindle fixture comprising a housing, a spindle therein having a tapered bearing portion adjacent one end thereof, a bearing for said tapered portion adapted to be held immovable relative to the housing, adjustable thrust and radial bearings for said spindle adjacent its other end arranged to move longitudinally with the spindle and be adjusted for radial wear, and readily accessible means for moving said movable bearings and spindle to adjust the fit between the immovable bearing and the spindle.

3. A grinding machine spindle fixture comprising a spindle housing, a spindle therein having a grinding wheel at one end and a driving pulley at the other, bearing portions adjacent and tapering towards the ends of the spindle, front and rear bearing sleeves for said bearing portions, the front sleeve adjacent the wheel being fixed, a member carrying the rear sleeve which is slidable longitudinally only of the housing and connected to the spindle to move it axially, readily accessible means to move said member to adjust the front bearing and means to adjust the rear sleeve to take up both radial and longitudinal wear.

4. A grinding machine spindle fixture comprising a housing, a spindle having a tapered bearing portion adjacent one end mounted therein, bearings for said spindle, one of said bearings being tapered to fit the tapered portion of the spindle and adapted to be held immovable relative to the housing, the other of said bearings being built up of a plurality of telescoping sleeves to form a thrust and radial bearing, the outer of said sleeves being mounted for sliding movement longitudinally of the housing, and means comprising screw threads on the outer sleeve and a nut engaging said screw threads and held against endwise movement for sliding the outer sleeve and moving said bearing and spindle longitudinally to adjust the tapered bearing.

5. A grinding machine spindle fixture comprising a housing, a spindle having bearing portions adjacent to and tapering towards the ends thereof, a flange on said spindle adjacent its rear end, a fixed bearing for the front end of the spindle, a movable bearing for the opposite end of the spindle, the latter comprising a plurality of telescoping sleeves, the inner of said sleeves tapering to form a radial bearing for the spindle and others of said sleeves cooperating with the flange on the spindle to form a thrust bearing therefor, and means for moving said sleeves and spindle longitudinally to adjust the front bearing.

6. A grinding machine spindle fixture comprising a housing, a spindle having bearing portions adjacent to and tapering towards the ends thereof, a fixed bearing for the front end of the spindle, a movable bearing for the opposite end of the spindle, the latter comprising an outer sleeve slidably mounted in the housing, a second sleeve longitudinally movable therein, a flange on the spindle between and movable by said sleeves, a tapered bearing within the inner sleeve which is adjustable for wear and means to move the assembled sleeves and spindle to adjust the front bearing.

Signed at Worcester, Massachusetts, this 6th day of Aug. 1920.

S. HAROLD AMSDEN.